US008438930B2

(12) United States Patent
Rogers et al.

(10) Patent No.: US 8,438,930 B2
(45) Date of Patent: May 14, 2013

(54) MECHANICAL SIGNAL PROCESSING ACCUMULATOR ATTENUATION DEVICE AND METHOD

(75) Inventors: Jeffrey J. Rogers, Centennial, CO (US); Paul R. Brennan, Centennial, CO (US)

(73) Assignee: United Launch Alliance, LLC, Englewood, CO (US)

( * ) Notice: Subject to any disclaimer, the term of this patent is extended or adjusted under 35 U.S.C. 154(b) by 1213 days.

(21) Appl. No.: 12/350,704

(22) Filed: Jan. 8, 2009

(65) Prior Publication Data
US 2010/0170222 A1 Jul. 8, 2010

(51) Int. Cl.
*G01L 7/00* (2006.01)
*G01F 23/00* (2006.01)
*B64G 1/40* (2006.01)

(52) U.S. Cl.
USPC ................ 73/700; 73/290 R; 244/172.2

(58) Field of Classification Search ............... None
See application file for complete search history.

(56) References Cited

U.S. PATENT DOCUMENTS

| | | | | |
|---|---|---|---|---|
| 3,314,292 A | * | 4/1967 | Schulte et al. ............... | 73/290 R |
| 3,463,920 A | * | 8/1969 | Kraushaar .................... | 376/159 |
| 3,501,632 A | * | 3/1970 | Wright et al. ................ | 378/52 |
| 4,730,449 A | * | 3/1988 | Cann .......................... | 60/203.1 |
| 4,825,647 A | * | 5/1989 | Cann .......................... | 60/203.1 |
| 6,283,412 B1 | * | 9/2001 | Mango ....................... | 244/135 R |
| 6,631,314 B2 | | 10/2003 | Fisher et al. | |
| 7,559,508 B1 | | 7/2009 | Taylor et al. | |
| 8,061,659 B2 | * | 11/2011 | Jallade ....................... | 244/172.2 |
| 2004/0231413 A1 | * | 11/2004 | Stenmark ..................... | 73/290 B |
| 2008/0142639 A1 | * | 6/2008 | Jallade ........................ | 244/172.2 |
| 2011/0071751 A1 | * | 3/2011 | Benavides .................... | 701/124 |

* cited by examiner

*Primary Examiner* — Andre Allen
(74) *Attorney, Agent, or Firm* — Sheridan Ross P.C.

(57) ABSTRACT

A liquid/gas interface pressure accumulator and mechanical filter device is especially adapted for use within a propellant utilization monitoring system of a space launch vehicle. The device provides a retrofit solution for overcoming problems associated with liquid entering a pressure sensing lines and pressure noises that collectively harm the ability to accurately measure fuel and oxidizer levels. One device is attached to each fuel and oxidizer tank of the launch vehicle. Each device includes a housing and an internal sensing chamber that is used to accumulate liquid before it can enter a pressure sensing communication line connected to a pressure sensing transducer. The construction of the device also allows filtering of undesirable pressure noises due to vibration, pressure pulsations, and other vibratory events that occur during operation of the space vehicle. The device is also selectively tunable to filter out certain frequencies and frequency ranges/bands. The invention in other aspects includes methods of improving pressure sensing applications in a propellant utilization monitoring system.

19 Claims, 9 Drawing Sheets

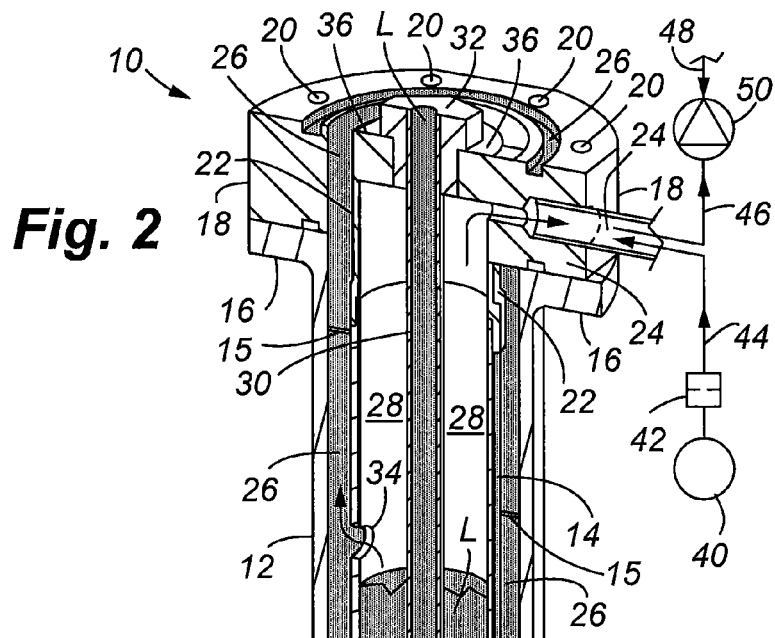
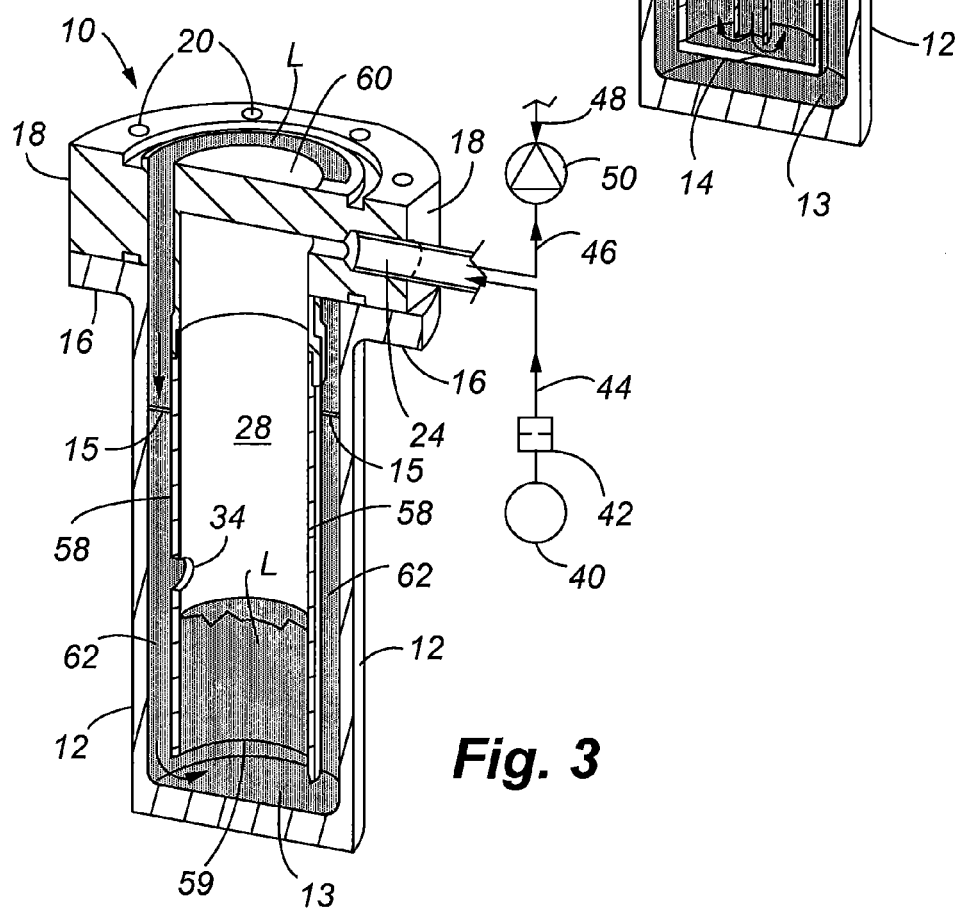
Fig. 2
Fig. 3

MECHANICAL SIGNAL PROCESSING ACCUMULATOR ATTENUATION DEVICE AND METHOD

This invention was made with Government support under Contract No. FA8816-06-C-0002 awarded by the United States Air Force. The government has certain rights in this invention.

FIELD OF THE INVENTION

The present invention relates to pressure sensing systems used in combustion propulsion systems, and more particularly, to a device and method used to improve pressure sensing in a propellant utilization monitoring system of a space vehicle.

BACKGROUND OF THE INVENTION

Rocket powered launch vehicles provide the thrust for launching and delivering a payload from the earth into earth orbit. Payloads may include complex assemblies such as satellites. Launch vehicles typically include one or more rocket engines configured to activate at different times or stages as the launch vehicle travels from the earth into orbit. A rocket engine in a launch vehicle may incorporate a solid or liquid propellant contained in a propellant tank, a combustion chamber, and a nozzle for directing the combusted propellant to accelerate the rocket in flight. Liquid propellant rockets are known as bi-propellant rocket systems because the liquid fuel also requires a liquid oxidizer to be stored in a separate tank. The liquid fuel and oxidizer are mixed with one another in desired ratios in order to most efficiently combust the propellant to generate an expanded gas that is accelerated through the nozzle for propelling the launch vehicle.

In order to maximize the efficiency of the propellant burn, a control loop is provided that monitors the amounts of the liquid oxidizer and the liquid fuel remaining in the respective tanks. Ideally, the liquid fuel and oxidizer are metered through valves leading into the combustion chamber at exact desired ratios in order to achieve the most efficient burn of the propellant and ensuring that all the propellant is consumed by the end of flight. Excess of one of the propellant commodities at the end of flight is known as propellant outage (dead weight) and degrades vehicle performance. The purpose of a propellant monitoring system is to minimize outage and provide sufficient control authority to counter vehicle anomalies that could jeopardize mission success. Failure to properly control the mixture ratio of the liquid fuel and oxidizer can result in premature engine shutdown that may ultimately sacrifice the ability of the launch vehicle to place the payload into the targeted orbit.

One general configuration for monitoring the levels of the fuel and oxidizer includes the use of pressure transducers that measure the pressure differential, referred to as the "delta pressure", within the tanks. The delta pressure is due to the liquid hydrostatic pressure within the propellant tank. By knowing the vehicle acceleration and liquid density, it is possible to back calculate the remaining propellant quantities from the delta pressures. Thus, these pressure readings are provided as inputs to a controller that calculates the most optimum fuel and oxidizer mixture ratios, and then provides output signals to control the operation of various mixing valves and other hardware components that control the amount of liquid fuel and oxidizer delivered to the combustion chamber of the engine.

One reference that discloses a propellant utilization system for a space vehicle capable of controlling mixture ratios for thrust sources of space vehicles includes the U.S. Pat. No. 6,631,314. This reference more particularly discloses a propellant utilization system for a space vehicle that may have first and second thrust sources, for example, a booster stage to launch and deliver a payload from a distance from the earth, and an upper stage that is activated to deliver the payload the remainder of the distance into a desired orbit. This system utilizes a set of algorithms to generate mixture ratios for each thrust source as each thrust source becomes active. The propellant utilization system includes a processing system including sequential logic, propellant logic, and mixture ratio logic. Sequential logic determines when a thrust source is active and provides flight parameters for the active thrust source to the propellant logic and the mixture ratio logic. The propellant logic processes information from propellant sources connected to the active thrust source, using the flight parameters for that thrust source to determine an amount of remaining propellant in each source. The mixture ratio logic generates a mixture ratio for the active source, using the flight parameters for that thrust source and information on the remaining amount of propellant in each source connected to the active thrust source. This U.S. Pat. No. 6,631,314 is hereby incorporated by reference in its entirety.

The liquid fuel and oxidizer are contained in tanks with some amount of ullage space above the liquid surface that contains a pressurized gas. The ullage increases as the propellant is consumed. The ullage pressure is controlled during flight so that adequate pressure can be applied to the liquid surface to satisfy the engine feed system requirements at the engine pump. In order to measure the amounts of the oxidizer and liquid propellant within the respective tanks, one method is to use a delta pressure transducer that receives two pressure sensing inputs, one from the liquid or head side (tank bottom) of the tanks and the other from the ullage side (tank top) of the tanks. The differential pressure sensed by pressure transducer at these two points in the tanks enables determination of the remaining amounts of liquid fuel and oxidizer within the respective tanks.

Presently, one method of sensing the pressure on the liquid side of the tanks is by the use of a small diameter tube that has one end immersed in the liquid, referred to as the head pressure sensing line. The head pressure sensing line utilizes purge gas to prevent entry of liquid within the sense line. Since the terminus of the sensing tube is immersed within the liquid, the column of liquid above the open end of the sensing tube will exert a certain amount of pressure which is transferred through the gas in the sensing line to the pressure transducer. Because of the extreme conditions under which the space vehicle operates, liquid can be forced into the sense lines by fluid pressure fluctuations generated primarily by the vibrations of the vehicle structure, acceleration transients, ullage pressurization transients, and other disturbances. Some of these disturbances can be unpredictable. More specifically, when pressure fluctuations in the liquid are of sufficient amplitude and frequency, liquid is ingested within the sense lines, but the small diameter of the sense lines make it more difficult for the liquid to be removed from the lines despite the presence of the expelling force from the purge gas. When liquid is ingested in a head sense line, the liquid prevents the purge gas from flowing out of the line at a normal rate. The purge gas continues to flow into the sense line from its source thereby increasing the pressure within the head sense line. The increased pressure in the head sense line results in an incorrect measurement of pressure in the line that is higher than the actual liquid head pressure within the tank.

Repeated pressure fluctuations result in repeat slugs of liquid ingestion into the head sense line that result in a mean pressure offset (bias) due to the build up of purge gases in the sense line. This bias cannot be removed by electronic filtering or other signal processing techniques. An intermittent or continued incorrect pressure reading on either of the tanks due to liquid ingestion in the head sense lines corrupts the propellant utilization system's ability to accurately determine the actual fuel/oxidizer levels, therefore resulting in erroneous mixture ratio adjustments. The erroneous mixture ratio adjustments can result in a propellant imbalance at engine shutdown causing a loss or reduction in vehicle payload delivery performance.

Therefore, there is a need for an improved device and system that prevents liquid ingestion into a pneumatic pressure sensing line. Preferably, the solution is one that has features of simplicity, will work well with cryogenic rocket propellants such as liquid oxygen, can be retrofit into existing systems without major redesign, has no moving parts, low weight, and can be tuned to filter-out specific pressure disturbances.

SUMMARY OF THE INVENTION

In accordance with the present invention, a passive mechanical signal processing accumulator attenuation device is provided. In another aspect of the invention, a method is provided for mechanical signal filtering and mechanical accumulating for a propellant utilization system especially adapted for use in the propellant utilization monitoring system of a launch vehicle. In another aspect of the present invention, an improved propellant utilization monitoring system is provided incorporating a mechanical solution for improving pressure signal processing. In order to reduce or eliminate incorrect pressure readings due to pressure fluctuations generated by vibrations or other causal pressure pulsations, the device and method of the present invention attenuates or dampens the pressures by isolating the location where pressure is measured in the system. This isolation is achieved by use of a device that is secured to a tank where pressure is being measured, and fluid is allowed to flow into the device whereby attenuation/dampening is achieved. A sensing chamber within the device therefore also acts as an accumulator. Pressure fluctuations causing displacement of fluid from the tank do not however enter the pressure sensing lines and rather enter the sensing chamber that has capacity to collect the displaced fluid. Therefore, the ability of the device to accumulate or collect liquid entering the device as a result of pressure fluctuations also helps to reduce incorrect pressure readings. Other mechanical filtering elements may be attached to the device enabling the device to filter targeted pressure signal frequencies to further improve pressure reading capabilities.

In accordance with the device of the present invention, in a first embodiment, the device incorporates an inner container or chamber and an outer thermal housing that surrounds the container. The inner container is closed at one end and has an opening at the other end to receive an inertia-tube. The inner container is secured to the fuel tank or oxidizer tank. The inertia-tube extends through an opening formed in the tank such that the liquid within the tank can travel through the inertia-tube into the inner container. The thermal housing is secured to the inner container such that there is a gap or space between the container and the housing defined as the thermal chamber. Liquid in the annular gap surrounding the sensing chamber minimizes heat transfer to the gas. Thermal isolation is further achieved by insulating the device when it is used for tanks which contain a cryogenic propellant. A sensing chamber is defined as the space within the inner container. A sensing port is formed through a flange that connects the inner container to the tank, and the sensing port provides a path between the sensing chamber and a pneumatic sensing line. Thus, the sensing port connected to the sensing line constitutes the gas pressure transmission path communicating with the head side of a delta pressure transducer. A purge gas is introduced through the sensing line and into the sensing chamber for the purpose of pushing ingested liquid out of the sense line. The inertia-tube constitutes the primary liquid pressure transmission path and allows liquid from the tank to enter the sensing chamber and fill the sensing chamber to a level that is controlled by a combination of the gas pressure of the purge gas within the sensing chamber and the location of the vent port. A vent port is formed on the inner container and enables the purge gas to escape thereby enabling the sensing chamber to be maintained at a desired equilibrated pressure. The sensing chamber within the housing acts to accumulate and attenuate liquid pressure surges from the tank and the purge gas from the sense line and serves as the interface where the equilibration of forces between the gas and the liquid take place. Locating the gas/liquid interface in the sensing chamber allows for equilibration of forces without significantly affecting the correct pressure signal. The inertia-tube provides inertia impedance (inertance and resistance) to dampen energy transfer associated with liquid motion due to pressure pulses from the tank since the inertia-tube has a relatively large length to diameter ratio, and therefore the liquid inertial and frictional forces act against the flow of fluid through the inertia-tube which therefore attenuates or dampens pressure oscillations especially those of higher frequency. When atypical pressure conditions are present in the operation of the launch vehicle, such as during takeoff, the liquid/gas interface within the sensing chamber will move thereby creating an out of balance situation in the sensing chamber. More specifically, during these conditions pressure disturbances within the plenum of the tank cause more liquid to travel through the inertia-tube into the sensing chamber, thereby filling the sensing chamber with liquid to a level above the vent port. When the vent port is blocked by the entering liquid, purge gas continues to enter the sensing chamber with no path for the purge gas to vent. The increasing pressure of the purge gas within the sensing chamber will eventually overcome the increased liquid level within the sensing chamber, thereby forcing the liquid in a reverse direction back through the inertia-tube and into plenum of the tank. When the liquid level has lowered enough to expose the vent port, the purge gas is again able to properly vent through the vent port which will reduce the gas pressure in the sensing chamber. The sensing port is located well above the vent port to provide sufficient volume capacitance so that when liquid rises in the sensing chamber, the liquid cannot reach the level of the sensing port because the amount of gas in the sensing chamber cannot be compressed or displaced to a degree which would allow the liquid to enter the sensing port. Thus, the sensing chamber is designed to have a volume and a spacing between the vent port and sensing port to handle known pressure disturbances that could occur during operation of the launch vehicle. Once equilibrium is achieved, the pressure within the sensing lines allows the transducers to generate accurate pressure readings. During times in which an out of balance situation exists, the time required to regain equilibrium is not great enough to result in a significant duration of incorrect pressure readings.

In another aspect of the present invention, it is also proposed that by changing the inertance, resistance, and capacitance of the accumulator, the noise-filtering function can be modified to tune the device to pass only desired pressure signals through the sense lines, thereby further providing a means to control pressure sensing capabilities of a propellant utilization or other fluid monitoring system.

Because the accumulator eliminates liquid ingestion, another feature of the present invention is that in cryogenic fluid applications the accumulator protects the pressure transducer from over pressure conditions which can harm the transducer. When cryogenic fluid is pushed far into a warm sense line, it will flash boil and create high pressure spike that can exceed the allowable pressure range of the pressure transducer.

The foregoing features and advantages of the present invention will become more apparent with a review of the following detailed description, taken in conjunction with the drawings.

BRIEF DESCRIPTION OF THE DRAWINGS

FIG. 2 is an enlarged fragmentary perspective view of the device of the present invention in a first preferred embodiment;

FIGS. 3-8 are fragmentary views of the device of the present invention in other embodiments;

DETAILED DESCRIPTION

Figure 1:
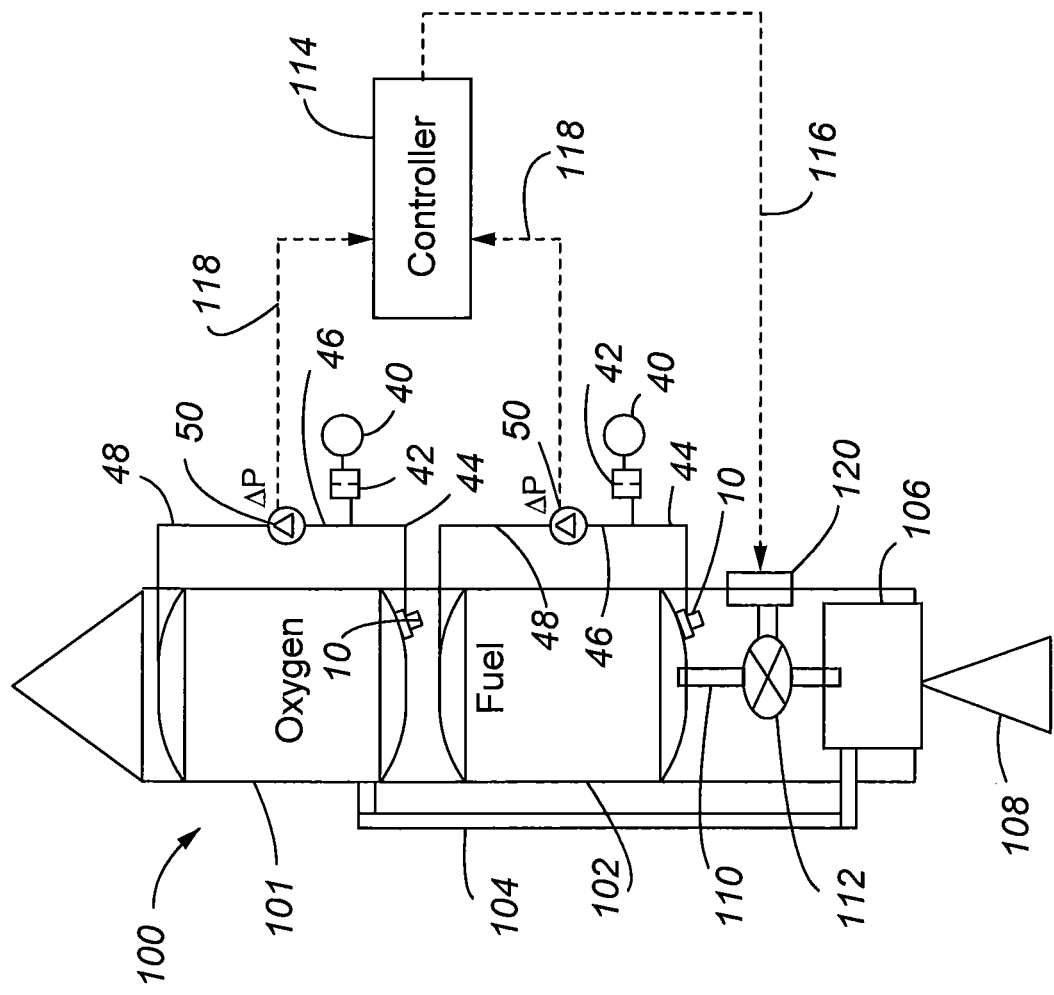
FIG. 1 is a schematic diagram of components of a launch vehicle to include a propellant utilization monitoring system.

Referring to FIG. 1, a simplified schematic diagram is provided showing a launch vehicle 100 along with some of the major components of the propulsion system and propellant utilization monitoring system. More specifically, FIG. 1 illustrates the vehicle 100 having an oxidizer tank 101 that may contain a liquid propellant such as oxygen. A separate fuel tank 102 is provided that is also housed within the launch vehicle. A delivery line 104 carries the oxidizer to a combustion chamber 106 wherein the oxidizer is mixed with the fuel that enters the combustion chamber 106 through a mixing valve assembly 112. Fuel is carried from the tank 102 to the mixing valve 112 by a fuel delivery line 110. The expanded gas from the combustion is discharged through nozzle 108 which provides the motive force to move the launch vehicle. The optimum mixture ratio of fuel and oxidizer is one that results in efficient combustion and ensures all propellants are expended at the end of flight to minimize outage.

With respect to the propellant utilization monitoring system, each of the tanks has a device 10 of the present invention secured to the liquid sides of the tanks. Respective delta pressure transducers 50 are used to measure delta pressures within the tanks. Two pneumatic sensing lines enter each of the pressure transducers, one being a head sense line 46 that provides the sensed pressure from the liquid (bottom) side of the corresponding tank, and the other being an ullage pressure sensing line 48 that communicates with the ullage (top) side of the tank. Purge lines 44 provide purge gas through the head (bottom) sense lines. Purge gas is provided by sources 40 through sintered orifices 42. Electrical signals are generated by the delta pressure transducers, shown as input signals 118, which are provided to the propellant utilization controller 114. Based upon the pressures reported by the transducers, the controller, through one or more algorithms, generates appropriate output signals 116 to a control element 120 that sets the mixing valve assembly 112 to the correct settings in order to provide the optimum fuel and oxidizer mixture within the combustion chamber 106.

Now referring to FIG. 2, the device of the present invention is illustrated in a first preferred embodiment. The structure of the device 10 is characterized by an outer thermal housing 12 that houses an internal container 14. The thermal housing 12 includes a housing flange 16 that extends flush with a corresponding connecting flange 18 used to connect the device 10 to a tank. The connecting flange 18 may include a plurality of threaded openings 20 which receive bolts (not shown) in order to secure the device to an opening formed in the tank. The container 14 may include an upper container part 22 that incorporates a side port 24 which extends through the connecting flange 18. The side port 24 communicates with the purge gas line 44 and head sense line 46. The container 14 is suspended within the thermal housing 12 by supports 15 such that a thermal gap 26 exists between the inner surface of the thermal housing and the outer surface of the container 14. The supports 15 are projections extending from the inner surface of the housing and that connect to the outer surface of the container 14. A sensing chamber 28 is defined as the open space within the container 14. An inertia-tube 30 extends through the sensing chamber and terminates above the bottom surface of the container 14. The inertia-tube 30 includes a tube fitting 32 which connects to the top surface or cap 36 of the container. The inertia-tube 30 communicates with the interior of the tank, referred to as the plenum, so that liquid L from the tank may pass through the inertia-tube and into the sensing chamber 28. A vent port or orifice 34 is provided on the container so that purge gas may be evacuated in the thermal gap between the housing 12 and container 14. Depending upon the desired system performance, one can select whether to vent purge gas into the tank or to expel the purge gas overboard. An insulated covering may be provided for the device 10 (not shown)

The functioning of the device 10 now will be described with respect to the first preferred embodiment. The liquid L travels through the inertia-tube 30 and fills the sensing chamber 28 to a predetermined height based upon the system pressure comprising the liquid pressure within the tank, and the counteracting purge gas pressure within the sensing chamber 28. Liquid position equilibrium within the device 10 is defined as when the liquid level is maintained at a desired height within the sensing chamber just below the location of the vent orifice 34. During operation of the launch vehicle, pressure pulsations of broad frequency ranges and high amplitudes will cause additional liquid from the tank to pass through the inertia-tube 30 and into the sensing chamber 28. If enough of the liquid is present within the sensing chamber to rise above the level of the vent orifice 34, the vent orifice 34 becomes blocked and purge gas within the sensing chamber will continue to accumulate until the gas pressure exceeds the liquid pressure within the sensing chamber. In response to the rising gas pressure within the sensing chamber, the liquid will ultimately be forced back through the inertia-tube in the opposite direction and into the tank, thereby restoring equilibrium within the sensing chamber. During the time in which the liquid covers the vent orifice, the device acts as an accumulator to accumulate the excess liquid from the tank, without allowing the liquid to enter the head sense line 46, which would otherwise disturb correct readings taken by the pressure transducer. Also, since the sensing chamber 28 is isolated from the tank, the frequency and amplitude of the pressures experienced within the tank are dampened and therefore, the device 10 also serves as a low pass filter sense since the problematic pressures are not transferred through the head sense line 46 which otherwise would create noise in the signal produced by the corresponding pressure transducer.

FIG. 3 illustrates another possible embodiment of the device of the present invention. In this embodiment, in lieu of the use of an inertia-tube 30, an inverted tube 58 is provided, and liquid from the tank is allowed to fill the sensing chamber through the semi-circular gap or annulus 62 that is disposed between the inner surface of the thermal housing 12 and the outer surface of the inverted tube 58. The inverted tube has a closed top or cap 60 and an open bottom defined by edge 59 which resides above the bottom surface 13 of the housing. The vent orifice 34 is formed at a desired height along the inverted tube 58 and, as with the first embodiment, the level of the liquid L is preferably just below the vent orifice in a state of equilibrium within the sensing chamber 28. During extreme pressure events, the liquid L will rise above the level of the vent orifice 34, thereby preventing escape of the purge gas which otherwise would normally bubble through the liquid in the annulus. As purge gas pressure continues to increase within the sensing chamber 28, the gas pressure overcomes the pressure of the liquid within the sensing chamber and forces the liquid in a reverse direction through the annulus back into the tank. Equilibrium is again restored when the liquid falls below the level of the vent orifice 34. Therefore, this embodiment utilizes the outer chamber fluid mass to provide the inertia component to obtain attenuation rather than a tube extending into the sensing chamber, such as the inertia-tube 30 as used in the embodiment of FIG. 2. One particular advantage in this embodiment is that the device is easier to initially fill (prime), since the liquid is able to flow more easily through the annulus 62 that has a much larger flow area as compared to the inertia-tube 30. The device is considered as being primed when the sensing chamber has been filled with the liquid to the desired level, preferably just below the location of the vent port.

Figure 4:
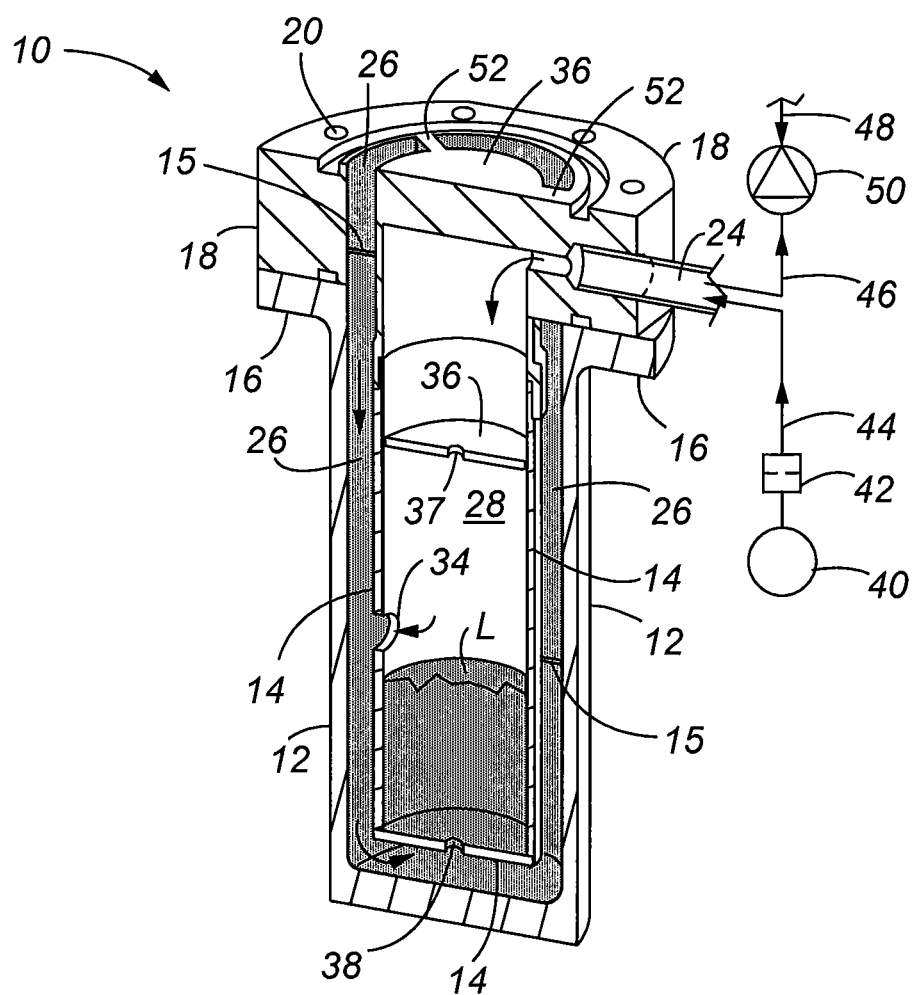

Referring to FIG. 4, another possible embodiment of the present invention is illustrated. In this embodiment, the sensing chamber 28 has a narrowed opening at the bottom, shown as opening 38, that communicates with the plenum of the tank through the annulus 26. Thus, the fluid in the annulus 26 is used to provide the inertia reduction to obtain attenuation rather than the inertia 30 as used in the embodiment of FIG. 2. The small opening 38 in the container 14 adds additional resistance, and thus additional dampening/attenuation. In the embodiment of FIG. 4, another feature provided is at least one separating baffle 52 that is used to separate the annulus 26 into compartments. The baffles 52 extend the length of the housing 12. The use of the baffle also further attenuates pressures by greater isolation of the liquid within the device. Compartmentalizing the annulus 26 also helps to direct the purge gas once it has exited the vent port. In some circumstances, it may be desirable to vent the purge gas back into the plenum of the tank at a particular location which is facilitated by the baffles. FIG. 4 also illustrates the use of a horizontally extending baffle 36 placed within the sensing chamber 28. The baffle serves as a physical barrier to the liquid so that liquid slosh does not contact the sensing port 24. The baffle 36 includes a central opening 37 which still allows a passage of gas.

Figure 5:
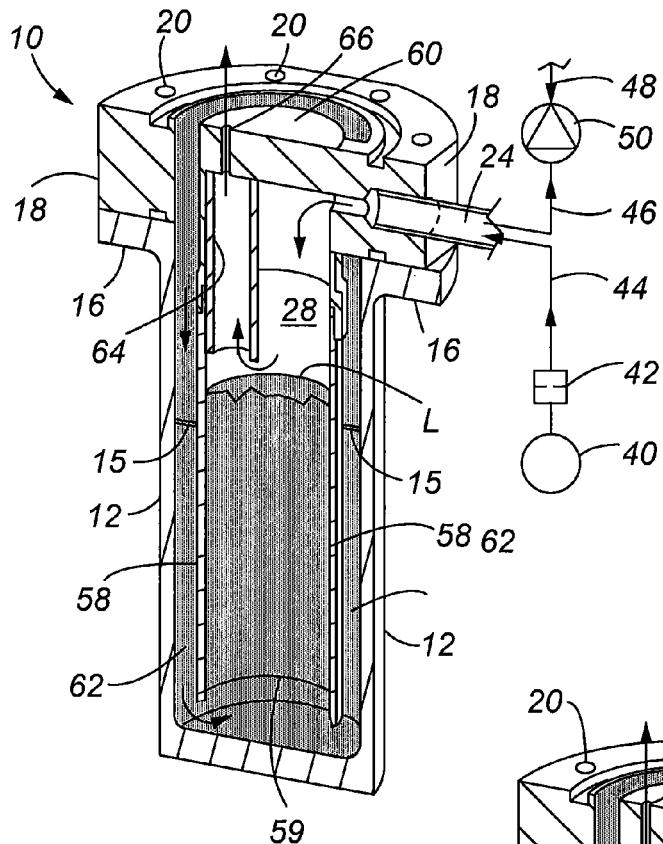

FIG. 5 illustrates another possible embodiment of the present invention. In this embodiment, a dedicated conduit 64 is provided as the vent port, and the conduit may be machined as a part of the housing. As shown, the vent port 64 communicates with a small vent orifice 66 that is formed in the closed top 60. In the embodiment of FIG. 5, the inverted tube 58 has an end 59 which is not closed. The addition of the machined conduit allows the vent port to be located at a higher elevation within the chamber.

Figure 6:
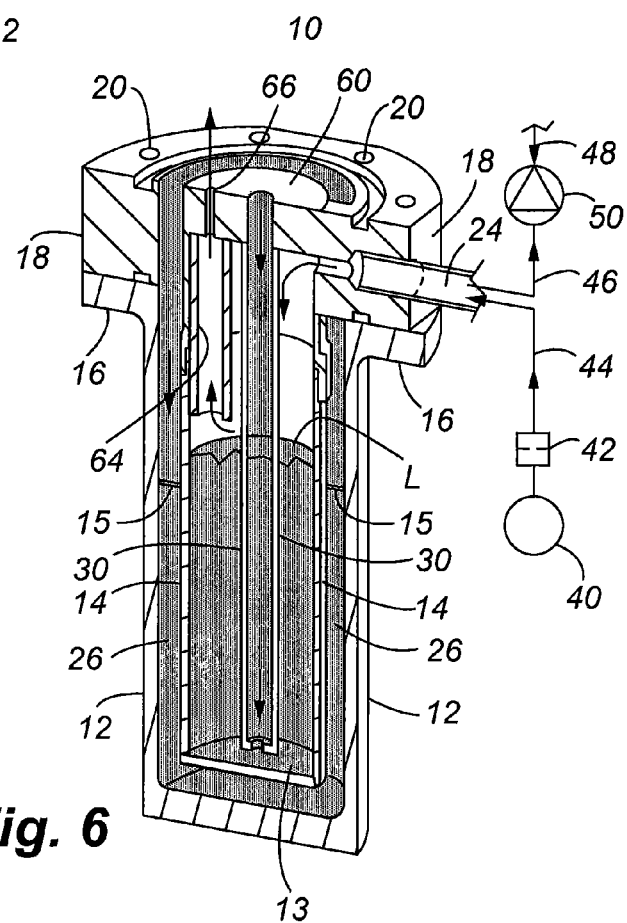

Referring to FIG. 6, another embodiment is illustrated including the use of conduit 64 and vent orifice 66; however, the construction of the device is more similar to FIG. 1 where an inertia-tube 30 is used, along with a container 14 having a closed bottom 13.

Figure 7:
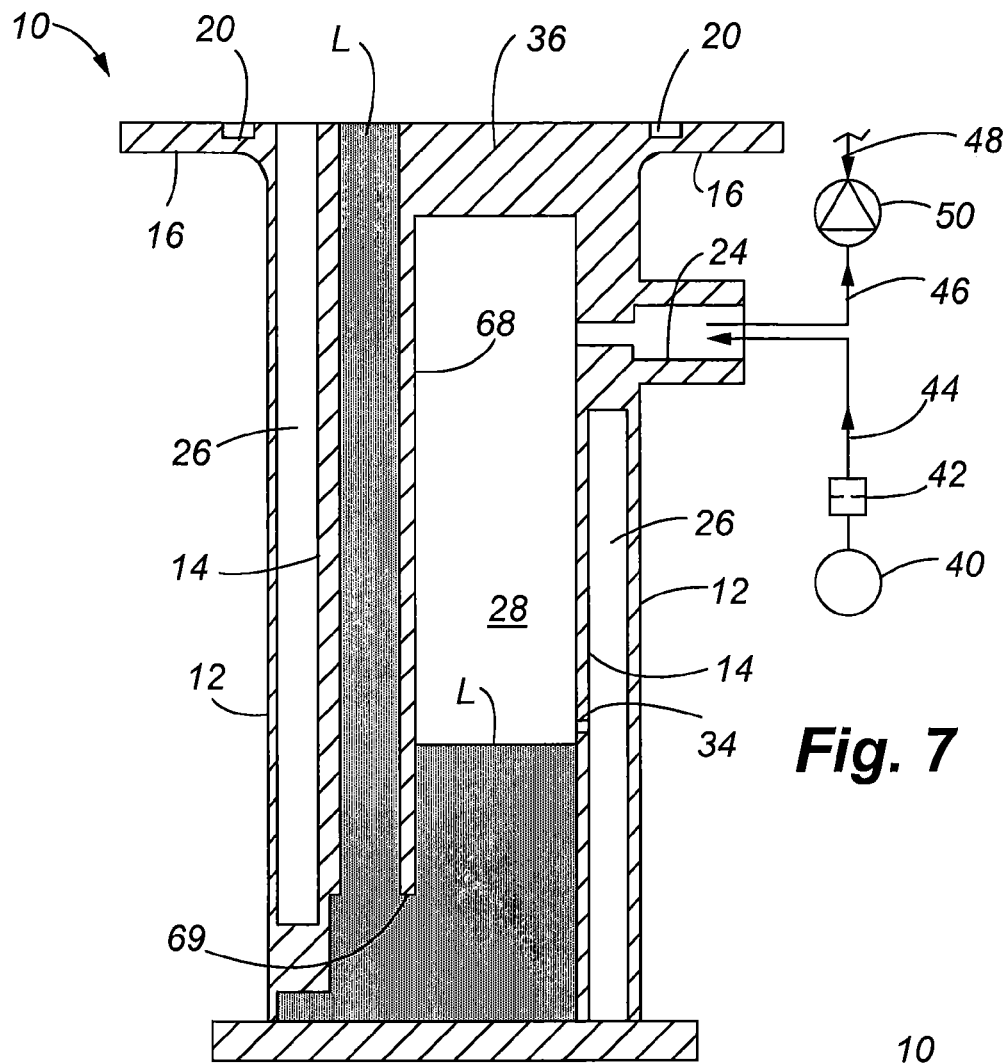

FIG. 7 illustrates another embodiment of the present invention that incorporates an interior separating wall 68 forming an inertia-tube by isolating liquid between this wall 68 and the container wall 14. In a perspective view, the wall 68 is tube shaped and has one side edge that is common with wall 14. With this embodiment, the inertia-tube can therefore be a machined part of the device. The lower open end 69 of the wall 68 communicates with the sensing chamber 28 such that liquid flows around the end 69 into the chamber 28. The vent port 34 is formed on an opposite side of the container 14. Purge gas is therefore allowed to escape the sensing chamber through the annulus 26.

Figure 8:
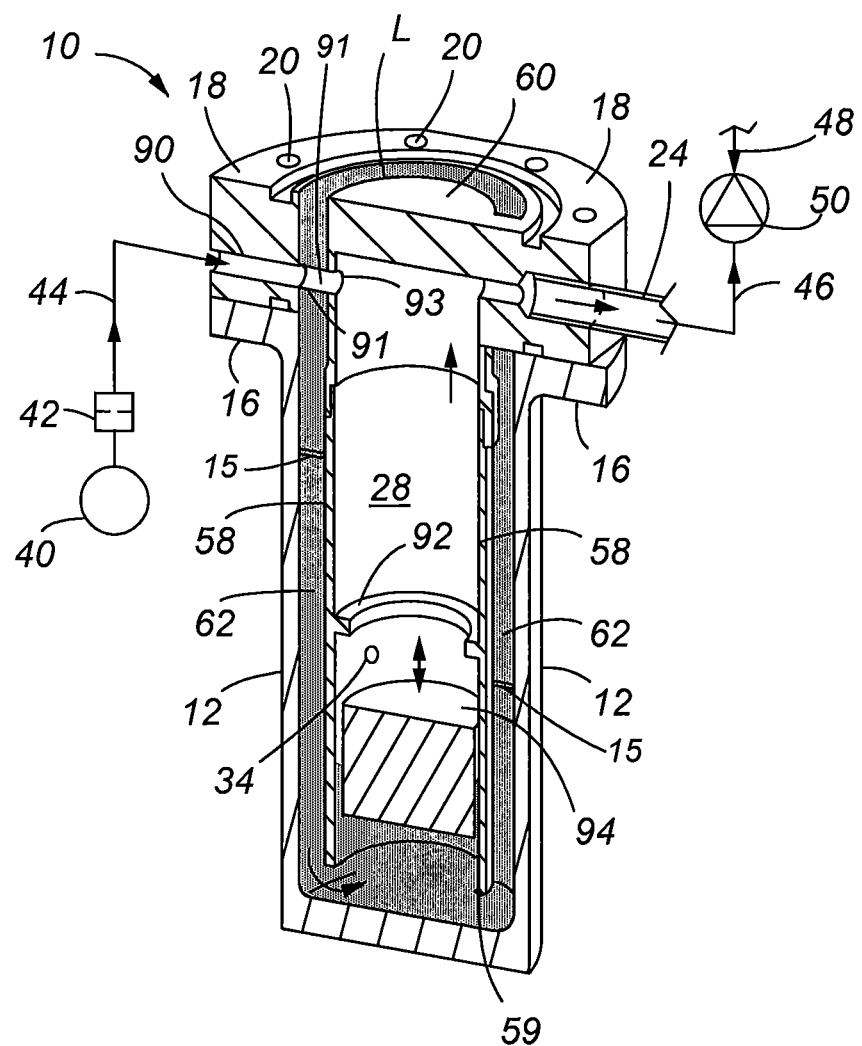

FIG. 8 illustrates yet another possible embodiment of the present invention. In this embodiment, a dedicated purge inlet 90 is provided, and which is formed on another part of the connecting flange 18. As shown, the purge inlet is an opening that extends through the connected flange, and a tube section 91 is used to convey the purge gas through an opening 93 formed in the inverted tube 58. The embodiment of FIG. 8 also incorporates the use of a float plug 94 and stop flange 92 in order to restore equilibrium within the sensing chamber in the event of overfill of liquid. Liquid fills the device through the annulus 62. Depending upon the force of the liquid within the device, the float plug 94 raises or lowers within the sensing chamber 28. In the event of overfill, the float plug 94 will raise, the float plug being more buoyant than the liquid. The float plug will then contact the stop flange 92, and additional liquid will therefore be able to further enter the device. Some small amount of liquid may pass around the float plug 94 and around the stop flange 92. However, the sensing port 24 is located well above the stop flange 92. Purge gas will continue to enter the sensing chamber and the purge gas will eventually overcome the force of the liquid within the chamber to thereby restore the device to equilibrium. The dedicated sense port with no purge gas reduces system pressures and is therefore a feature to provide greater accuracy. Although the embodiment of FIG. 8 is illustrated with the dedicated purge gas inlet, it shall be understood that the other embodiments may also be modified to incorporate a dedicated gas purge inlet.

It is also contemplated in the present invention that the device can be provided as an in-tank solution. In this case, each of the embodiments illustrated in FIGS. 2 through 8 would exclude the thermal housing 12 and would be directly mounted within the tank. This in-tank solution would achieve the same basic accumulating and attenuating properties as described herein.

Figure 9:
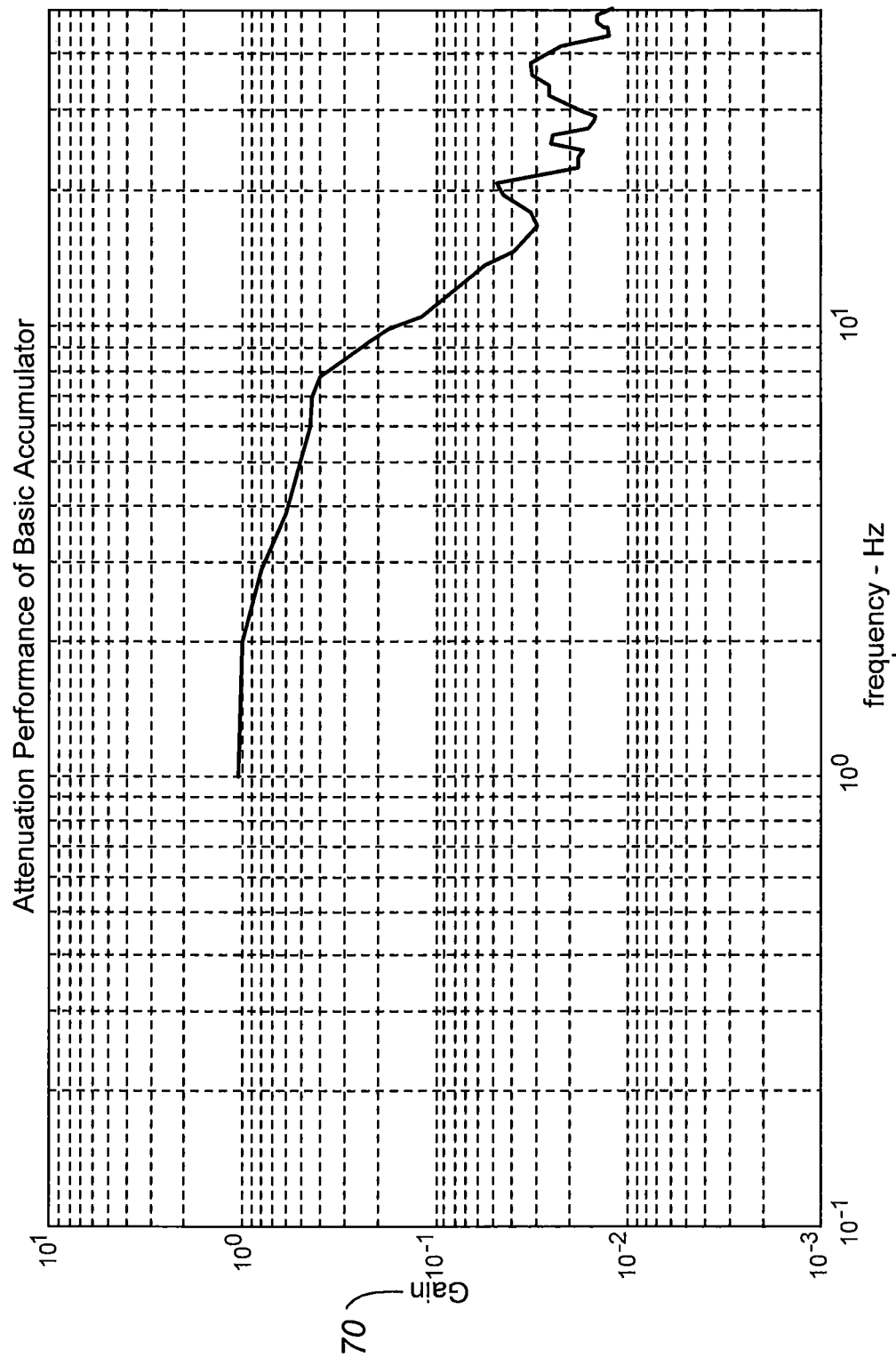
FIG. 9 is a graph illustrating an example of the filtering or attenuation capability of the device of the present invention.

FIG. 9 is a graph showing the basic attenuation capabilities of the device. The graph as shown provides this attenuation characteristics measured as a function of gain 70 on the vertical axis and frequency 72 on the horizontal axis. This figure demonstrates how this particular accumulating device acts as a low pass filter thereby allowing all pressure signal frequency content below the cutoff frequency to pass but attenuating the pressure signal frequency content above the cutoff frequency. The cutoff frequency is defined as a boundary in a system's frequency response at which energy flowing through the system begins to be reduced (attenuated) rather than passing through. For this particular design the cutoff frequency is about 3 to 5 Hz.

Figure 10:
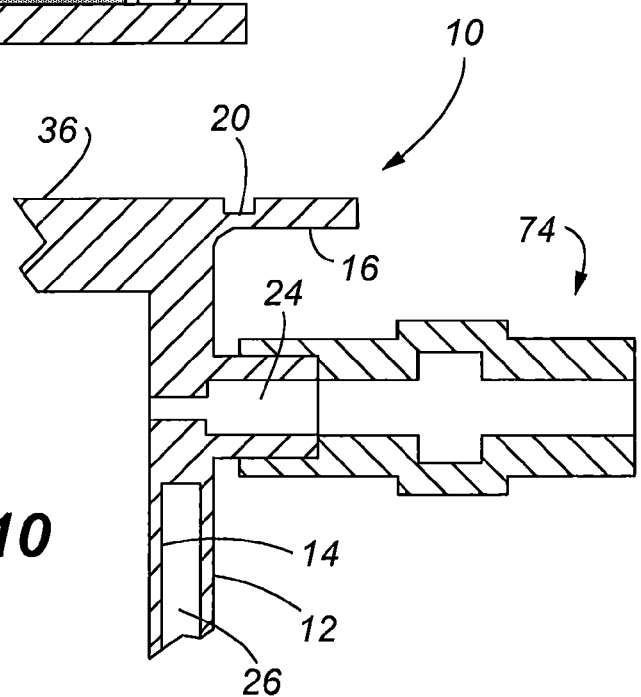
FIG. 10 is an enlarged fragmentary cross-section of the device of the present invention incorporating a detachable acoustic filter element for selectively filtering selected frequency bands of pressure signals.

Referring to FIG. 10, an enlarged cross section of the device 10 is illustrated in conjunction with a mechanical acoustical filtering element 74. The filtering element 74 is used to mechanically filter targeted frequency bands which may be responsible for the production of noise in the signals from the pressure transducers. As shown in the example of FIG. 10, the filter element 74 is secured to the sensing port 24. One way in which to incorporate the filtering element 74 is to construct the filter as a tube-like extension which communicates with the sensing line that in turn communicates with the pressure transducer.

Figure 11:
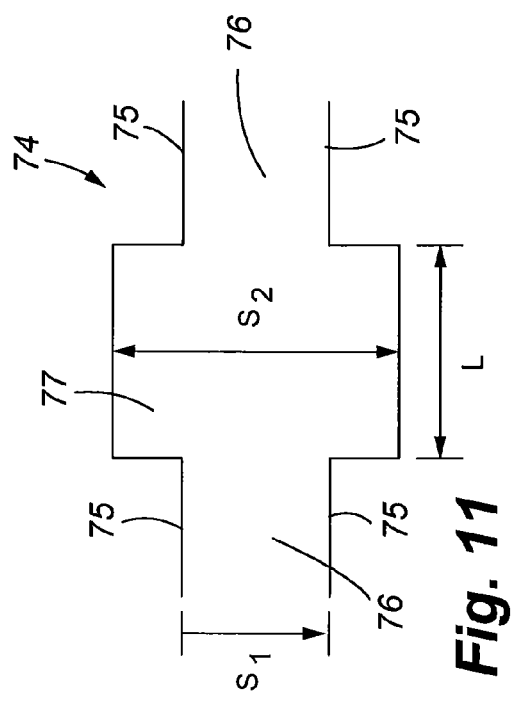
FIG. 11 is a schematic view of one example of an acoustic filter element.

Referring to FIG. 11, a schematic representation is provided of the filtering element 74. The filtering element has a continuous sidewall 75, an enlarged chamber portion 77, and an interior passageway 76. The particular dimensioning to include the size of the passage 76, shown as dimension S1, the sizes of the chamber 77, shown as the dimension S2, as well as the width of the chamber 77, illustrated as dimension L, can be modified to provide the desired mechanical filter.

Figure 12:
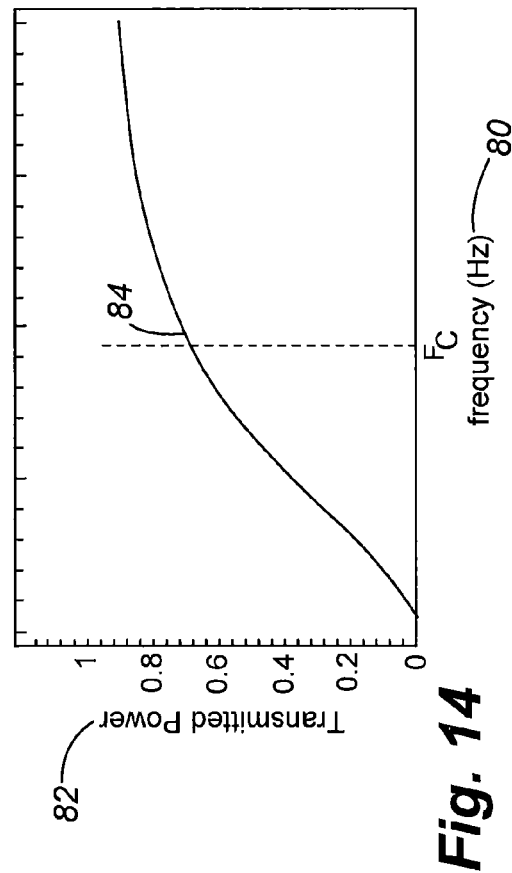
FIG. 12 is a graph illustrating the filtering capability of the filter element of FIG. 10 with respect to selected frequencies.

Referring to FIG. 12, a graphical representation is provided of the type of mechanical filtering that can be achieved by the mechanical filtering device 74 shown in FIG. 11, namely low pass filtering. In the graph, the frequency of the oscillating pressure 80 is plotted against the transmitted power 82 or gain. In this example, the cutoff frequency Fc is shown at the point where the gain begins to exponentially reduce. The line 84 indicates the transmissibility of the oscillating pressure noting that the transmissibility reduces as the oscillating pressure frequency increases such that around 800 Hz, there is little or no oscillating pressure transmitted by the connected sense line.

Figure 13:
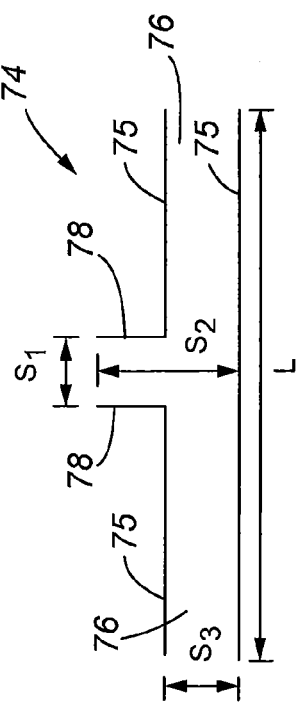
FIG. 13 is another schematic view of another acoustic filter element.

FIG. 13 illustrates another type of mechanical filter 74 that may be used to attenuate selected frequencies. In this example, in lieu of a central chamber 77, an extension 78 is provided between two opposing lengths of the sidewall 75. The dimensions S1, S2, S3, and L may be modified to specifically tune the mechanical filter for the targeted frequencies.

Figure 14:
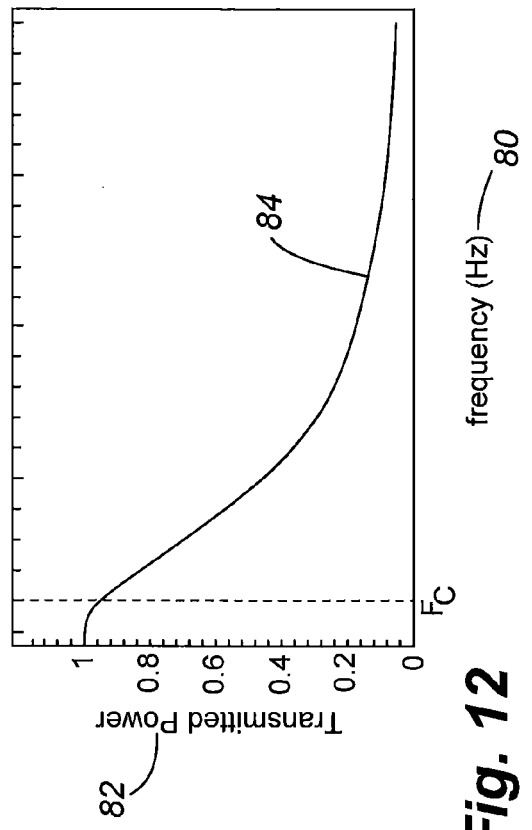
FIG. 14 is a graph illustrating the filtering capability of the filter element of FIG. 12 with respect to selected frequencies.

Referring to FIG. 14, another graph is provided showing the filtering function of the filter element in FIG. 13, namely, high pass filtering. The cut-off frequency Fc is also shown that where frequencies below that threshold have decreasing transmissibility.

Figure 15:
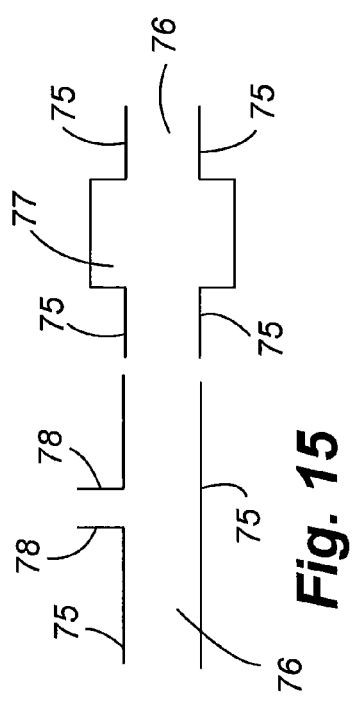
FIG. 15 is another schematic view of a another type of acoustic filter element.

Referring to FIG. 15, yet another mechanical filter 74 is illustrated in which the filter is a combination of the structures illustrated in FIGS. 11 and 13. In this combination, the filter elements are placed in series. This type of filter is known as a band-pass filter and passes frequencies within a certain range (between the high, $f_{c\ high}$, and low, $f_{c\ low}$, cutoff frequency) and attenuates frequencies outside that range.

Figure 16:
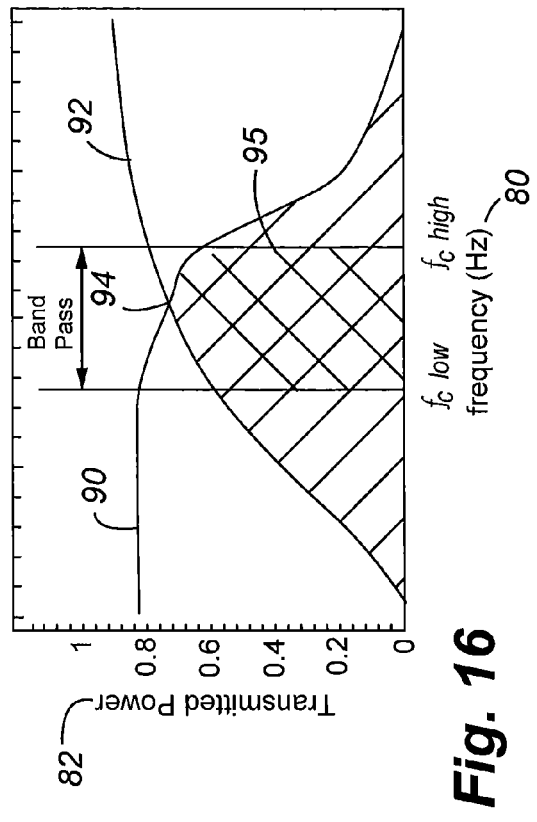
FIG. 16 is a graph illustrating the filtering capability of the filter element of FIG. 15 with respect to selected frequencies.

Referring to FIG. 16, the type of filtering achieved by this combination is band pass filtering at approximately 400 Hz. The shaded area 95 shows the transmissibility of oscillating pressures through the filter element, noting that transmission line 90 and line 92 intersect at approximately the 400 Hz target.

Figure 17:
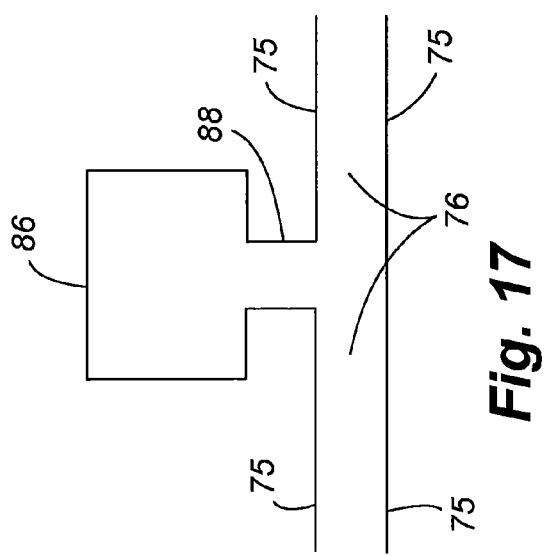
FIG. 17 is another schematic view of another type of acoustic filter element.

Referring to FIG. 17, yet another mechanical filtering element 74 is provided. In this example, a closed chamber 86 is provided which is located between opposing lengths of sidewall 75. Chamber 86 communicates with the passage 76 by small branch 88. This element act as a band-stop filter that passes most frequencies unaltered, but attenuates those in a specific range (between the high, $f_{c\ high}$, and low, $f_{c\ low}$, cutoff frequency) to very low levels. It is the opposite of a band-pass filter.

Figure 18:
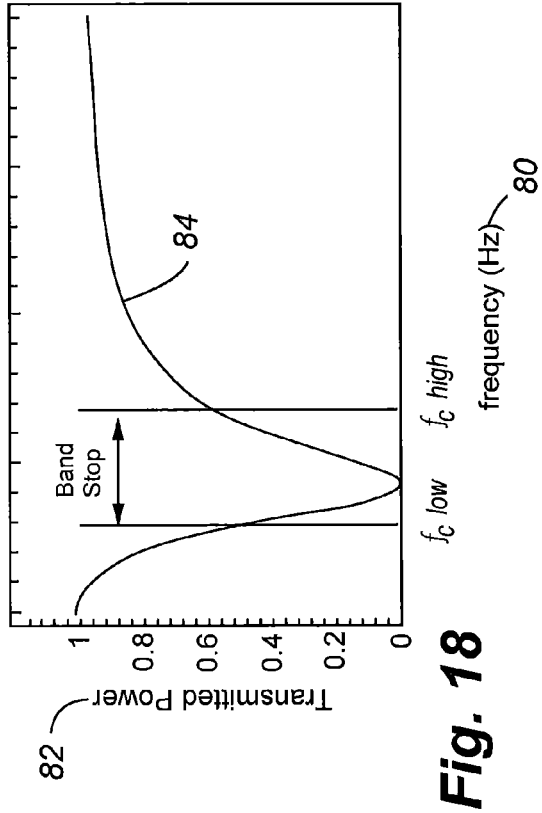
FIG. 18 is a graph illustrating the filtering capability of the filter element of FIG. 17 with respect to selected frequencies.

Referring to FIG. 18, the type of filtering achieved is band stop around 200 Hz. The transmission line 84 sharply gains in frequencies above and below the target 200 Hz.

With respect to the propellant utilization system of the present invention, the present invention contemplates incorporation of similar elements as those disclosed in U.S. Pat. No. 6,631,314. More specifically, the system of the present invention includes a controller for receiving signals from the pressure transducers, the controller including a microprocessor and logic for manipulating algorithms to generate control signals sent to a mixing valve assembly that controls a ratio of oxidizer and fuel introduced into the combustion chamber of the space vehicle.

With respect to the method of the invention, liquid is prevented from being ingested into pneumatic pressure sensing lines. The method is achieved by provision of an isolation or sensing chamber that receives a flow of liquid from the tank, and prevents liquid ingestion by a pressure regulation function where purge gas and the internal construction of the device overcomes the effects of rising liquid within the sensing chamber that otherwise would enter the pneumatic sensing line.

Several unique functions are combined within the device of the present invention. As mentioned, the device acts as an accumulator to mitigate or prevent liquid ingestion into the pressure sensing lines thereby preventing erroneous pressure signals generated by the pressure transducers. Another way in which to conceptually view this function is that the device has a capacitance to store energy as a pressurized volume temporarily during extreme vibration events and/or extreme pressure pulsations. Another function of the device is noise filtering in which cleaner signals emitted from the pressure transducers have less noise by selective filtering of oscillating pressures having frequencies responsible for producing noise in the transducer signals, before the pressures are transmitted to the transducers.

There are numerous advantages of the present invention. The device can be constructed so that it is relatively small, lightweight and low cost with no moving parts. Although one purpose of the invention is to prevent liquid from entering pneumatic sense lines, the construction of the device allows it to also function as a mechanical filter for eliminating or dampening particular fluid frequencies. The primary fluid communication path for the device of the present invention can be either an inertia tube such as in the first embodiment, or an annulus located between an interior container and housing in other embodiments. The diameter of the sensing chamber and the diameter, and length, of the inertia-tube or size of the annulus between the inverted tube and housing can be modified to thereby increase or decrease attenuation of the tank plenum pressure disturbances. The device has no moving parts and is passive, thereby reducing the number of potential failure modes unlike other accumulators that may include springs, bladders, diaphragms, or other moving elements. The device of the present invention is especially adapted for cryogenic applications. Heat transferred to the device from the environment can be carried away and dissipated into the liquid plenum of the tank. The liquid inside the sensing chamber of the device can therefore remain below the saturation level and boiling is prevented inside the sensing chamber ensuring pressure measurement accuracy. Furthermore, given the compactness of the device, it can be readily insulated. The invention achieves an effective way in which to maintain a liquid column at a fixed height within the device, while simultaneously being able to filter out pressure disturbances. Unlike many other types of accumulators that simply provide a reservoir of fluid to cope with high fluid demands or to absorb fluid transients, the device of the present invention is designed to hold the liquid level within the device at a specific location and simultaneously having the capability to filter out pressure transients. Although the invention has been described with respect to use on space vehicles, it shall be understood that the invention is not limited in applicability to rockets but can also be applied to any liquid head pressure sensing system, such as ground storage tanks, for which pressure oscillations corrupt the measurement of the liquid head pressure.

It shall also be understood that while the invention has been described in the preferred embodiments as a modular design, the invention can also be made as a one-piece design in which a single piece of material can be molded or milled into a desired shape to achieve the desired functionality Although the present invention has been described above with respect to one or more preferred embodiments, it shall be understood that various changes and modifications can be made to the invention in accordance with the scope of the claims appended hereto.

What is claimed is:

1. A device especially adapted for attenuating and filtering selected pressure frequencies generated from a pressurized liquid tank to which the device is connected, comprising;
   a container having a sidewall, a bottom wall, and a top wall, open space within said container defining a sensing chamber;
   an inertia-tube extending into said container through said top wall and communicating with said sensing chamber, said inertia-tube having a distal end positioned above said bottom wall of said container;
   a thermal housing surrounding said container, said housing having a sidewall and a bottom wall spaced from said container, a gap between said container and said housing defining an annular space;
   a sensing port formed through said container, said sensing port having a first end communicating with said sensing chamber and a second end communicating with a sense line connected to the sensing port;
   a vent port formed on said sidewall of said container that enables purge gas within said sensing chamber to escape said device, thereby maintaining said liquid gas interface at equilibrium; wherein
   liquid from the pressurized tank fills said inertia-tube, and an amount of said liquid being maintained in said sensing chamber, and further wherein purge gas is introduced into said sensing chamber, wherein during equilibrium, the liquid within said sensing chamber resides below a level of the vent port, and when said device is out of balance by excess liquid in the sensing chamber, said device returns to equilibrium by displacing the liquid back into the tank.

2. A device, as claimed in claim 1, further including:
   a detachable or fixed cavity type acoustic filter connected to said sensing port to selectively filter selected oscillating pressure frequencies.

3. A device, as claimed in 1, further including:
   at least one longitudinal baffle extending between said thermal housing and said container thereby compartmentalizing liquid or gas within said annular space between said thermal housing and said container.

4. A device, as claimed in claim 1, further including:
   a transversely mounted baffle placed in said sensing chamber, and said transversely mounted baffle having an opening therethrough, said baffle for preventing slosh of liquid into said sensing port.

5. A method of attenuating oscillating pressures in a liquid tank when measuring pressure within the tank, said method comprising the steps of:
   providing a device secured to the tank, said device comprising a thermal housing having a sidewall and a bottom wall, at least one of a container or inverted tube placed concentrically within said thermal housing and spaced from said thermal housing by an annular space;
   providing a liquid pathway from said tank into said device;
   providing a sensing port communicating with said device, said sensing port having a first end communicating with a sensing chamber within said device, and said sensing port having an opposite end that communicates with a pressure transducer that measures pressure from said sensing port;
   receiving liquid from said tank into said device; and
   maintaining equilibrium within said device by a liquid gas interface that prevents liquid from entering said sensing port.

6. A method, as claimed in claim 5, further including:
   providing a vent port in said device that enables purge gas within said sensing chamber to escape said device, thereby maintaining said liquid gas interface at equilibrium.

7. A method, as claimed in claim 5, wherein:
   said device further includes an inertia-tube inserted within said container, said liquid path extending through said inertia-tube enabling liquid to fill the device to a pre-designated level at equilibrium.

8. A method, as claimed in claim 5, wherein:
   the liquid path is defined by the annular space between the inverted tube and the thermal housing, and liquid enters the container through the annular space and fills the sensing chamber to a preselected level at equilibrium.

9. A method, as claimed in claim 5, wherein:
   purge gas is provided to said sensing chamber through said sensing port.

10. A method, as claimed in claim 5, wherein:
    purge gas is provided to the sensing chamber through a dedicated purge line remote from said sensing port.

11. A device especially adapted for attenuating and filtering selected oscillating pressure frequencies generated from a pressurized liquid tank to which the device is connected, said device comprising:
    an inverted tube having a sidewall, a top wall, and an open bottom, open space within said inverted tube defining a sensing chamber;
    a thermal housing surrounding said inertia-tube, said housing have a sidewall and a bottom wall each spaced from said inverted tube, the gap between said container and said inverted tube defining an annular space;

a sensing port formed on said container, said sensing port having a first end communicating with said sensing chamber and a second end communicating with a sense line;

a vent port formed on said sidewall of the inertia-tube, said container thereby providing a passageway between said sensing chamber and said annular space;

wherein liquid from the tank fills said annular space and an amount of area within said sensing chamber, and further wherein purge gas introduced into said sensing chamber such that in equilibrium, the liquid within said sensing chamber resides below a level of the vent port, and when said device is out of balance by excess liquid in the sensing chamber, said device returns to equilibrium by displacing liquid back into the tank.

12. A device, as claimed in claim 11, further including:
a detachable filter connected to said sensing for selectively filtering selected pressure frequencies.

13. A device, as claimed in claim 12, wherein:
said filter element includes at least one of a low pass filter, a high pass filter, a band pass filter, and a band stop filter.

14. A device, as claimed in claim 11, further including:
at least one longitudinal baffle extending between said thermal housing and said inverted tube thereby compartmentalizing liquid or gas within said annular space between said thermal housing and said inverted tube.

15. A device, as claimed in claim 11, further including:
a transversely mounted baffle placed in said sensing chamber, and said transversely mounted baffle having an opening therethrough, said baffle for preventing slosh of liquid into said sensing port.

16. A device, as claimed in claim 11, wherein:
said vent port includes a conduit communicating with an upper end of said sensing chamber, and a vent orifice communicating with said conduit enabling escape of purge gas from said sensing chamber.

17. A device, as claimed in claim 11, further including:
a stop flange formed around a periphery of said inverted tube and extending into said sensing chamber; and
a float plug located within said inverted tube, said float plug being floatable in the liquid and said float plug contacting said stop flange as liquid rises within said sensing chamber.

18. In combination, a liquid cryogenic tank and a device especially adapted to attenuating and filtering selected pressure frequencies device, said combination comprising:
said pressurized tank containing an amount of a cryogenic liquid therein;
said device connected to said tank, whereby a liquid passageway is formed between said tank and said device thereby allowing liquid from said tank to flow into said device, said device including a thermal housing, and a container disposed in said thermal housing in a concentric relationship whereby an annular gap extends between said housing and said container, and an inertia-tube extending into said container and communicating with said sensing chamber, said inertia-tube defining the liquid passageway between the tank and the device, a sensing port formed through the container, the sensing port having a first end communicating with the sensing chamber within the device and a second end communicating with a sense line connected to the sensing port; and
a vent formed in said container for venting purge gas introduced into said container.

19. In combination, a liquid cryogenic tank and a device especially adapted to attenuating and filtering selected pressure frequencies, said combination comprising:
said pressurized tank containing an amount of a cryogenic liquid therein;
said device connected to said tank, whereby a liquid passageway is formed between said tank and said device thereby allowing liquid from said tank to flow into said device, said device including a thermal housing, and an inverted tube disposed in said thermal housing in concentric relationship whereby an annular gap extends between said housing and communicating with said sensing chamber, said inverted tube defining the liquid passageway between the tank and the device, a sensing port formed through the inverted tube, the sensing port having a first end communicating with the sensing chamber within the device and a second end communicating with a sense line connected to the sensing port; and
a vent formed in said inverted tube for venting purge gas introduced into said container.

* * * * *